(12) United States Patent
McCune et al.

(10) Patent No.: US 7,955,046 B2
(45) Date of Patent: Jun. 7, 2011

(54) GAS TURBINE ENGINE FRONT ARCHITECTURE MODULARITY

(75) Inventors: Michael E. McCune, Colchester, CT (US); Brian D. Merry, Andover, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 867 days.

(21) Appl. No.: 11/860,719

(22) Filed: Sep. 25, 2007

(65) Prior Publication Data

US 2009/0081039 A1    Mar. 26, 2009

(51) Int. Cl.
*F01D 25/24* (2006.01)

(52) U.S. Cl. .............. 415/122.1; 415/124.1; 415/201; 415/230; 416/160; 416/170 R; 416/172

(58) Field of Classification Search .......... 415/60, 415/68, 122.1, 122.2, 124.1, 201, 230; 416/160, 416/170 R, 172
See application file for complete search history.

(56) References Cited

U.S. PATENT DOCUMENTS

| | | | | |
|---|---|---|---|---|
| 2,969,644 A | * | 1/1961 | Williams et al. | 415/122.1 |
| 3,442,444 A | * | 5/1969 | Kievit | 415/164 |
| 3,761,205 A | * | 9/1973 | Cronstedt | 415/122.1 |
| 3,902,822 A | * | 9/1975 | Andrews et al. | 416/170 R |
| 4,251,987 A | | 2/1981 | Adamson | |
| 4,456,425 A | * | 6/1984 | McCarty et al. | 415/122.1 |
| 4,744,214 A | * | 5/1988 | Monsarrat et al. | 415/143 |
| 4,751,816 A | | 6/1988 | Perry | |
| 4,916,894 A | | 4/1990 | Adamson et al. | |
| 4,934,140 A | * | 6/1990 | Dennison et al. | 60/226.1 |
| 5,010,729 A | | 4/1991 | Adamson et al. | |
| 6,895,741 B2 | | 5/2005 | Rago et al. | |
| 6,964,155 B2 | | 11/2005 | McCune et al. | |
| 7,021,042 B2 | | 4/2006 | Law | |
| 7,201,558 B2 | | 4/2007 | Norris et al. | |
| 2006/0130456 A1 | | 6/2006 | Suciu et al. | |
| 2007/0022738 A1 | | 2/2007 | Norris et al. | |

* cited by examiner

*Primary Examiner* — Igor Kershteyn
(74) *Attorney, Agent, or Firm* — Carlson, Gaskey & Olds, P.C.

(57) ABSTRACT

A gas turbine engine is disclosed that includes a spool having a compressor section. An inlet case is arranged axially upstream from the compressor section. A gearbox is secured to the inlet case. The gearbox couples the spool and a fan. A sealing assembly is arranged between the inlet case and the gearbox to provide a sealed bearing compartment. The inlet case, gearbox and seal assembly provide a module. A fastening element removably secures the module to the spool. The gas turbine engine can be serviced by disconnecting the fastening element from the engine core. The gearbox and inlet case can be removed as a module from the engine core without disassembling the gearbox.

14 Claims, 4 Drawing Sheets

GAS TURBINE ENGINE FRONT ARCHITECTURE MODULARITY

BACKGROUND

This disclosure relates to a core housing and gearbox configuration for gas turbine engines.

Gas turbine engines for commercial aircraft applications typically include an engine core housed within a core nacelle. In one type of arrangement known as a turbofan engine, the core drives an upstream fan that provides airflow into the core. A fan case and nacelle surround the fan and at least a portion of the core. A compressor section within the core compresses the air from the fan and delivers it downstream into a combustion section. One type of compressor section includes low and high pressure compressors, each with one or more stages. The compressed air is mixed with fuel and combusted in the combustion section. The products of this combustion are then delivered downstream over turbine rotors, which are rotationally driven to provide power to the engine.

The core housing is typically constructed from multiple cases that support various portions of the core. The inlet case is arranged at the front of the core to receive airflow from the fan. Some gas turbine engines include a gearbox arranged at the front of the core between a spool and the fan. The spool supports one or more turbine stages that rotational drive the fan through the gearbox. One problem with geared fan engines is the lack of modularity at the front of the core. For example, when the gearbox needs to be removed from the engine. For example, to service the compressor section, it must be disassembled in order to remove it. In particular, in one type of arrangement, a gearbox bearing compartment seal is positioned such that it prevents the gearbox from being removed as a unit or module, which is time consuming and costly. Further, the gearbox cannot be removed along with the low pressure compressor inlet case. What is needed is a gas turbine engine front architecture configured to permit the gearbox and the inlet case to be removed as a single unit or module without disassembling the gearbox.

SUMMARY

A gas turbine engine is disclosed that includes a spool having a compressor section. An inlet case is arranged axially upstream from the compressor section. A gearbox is secured to the inlet case. The gearbox couples the spool and a fan. A seal assembly is arranged between the inlet case and the gearbox to provide a sealed bearing compartment. The inlet case, gearbox and seal assembly provide a module. A fastening element removably secures the module to the spool, in one example.

The gas turbine engine can be serviced by disconnecting the fastening element from the engine core. The gearbox and inlet case can be removed as a module from the engine core without disassembling the gearbox. The entire gearbox can be changed out quickly or easy access can be provided to the compressor section.

These and other features of the disclosure can be best understood from the following specification and drawings, the following of which is a brief description.

DETAILED DESCRIPTION

Figure 1:
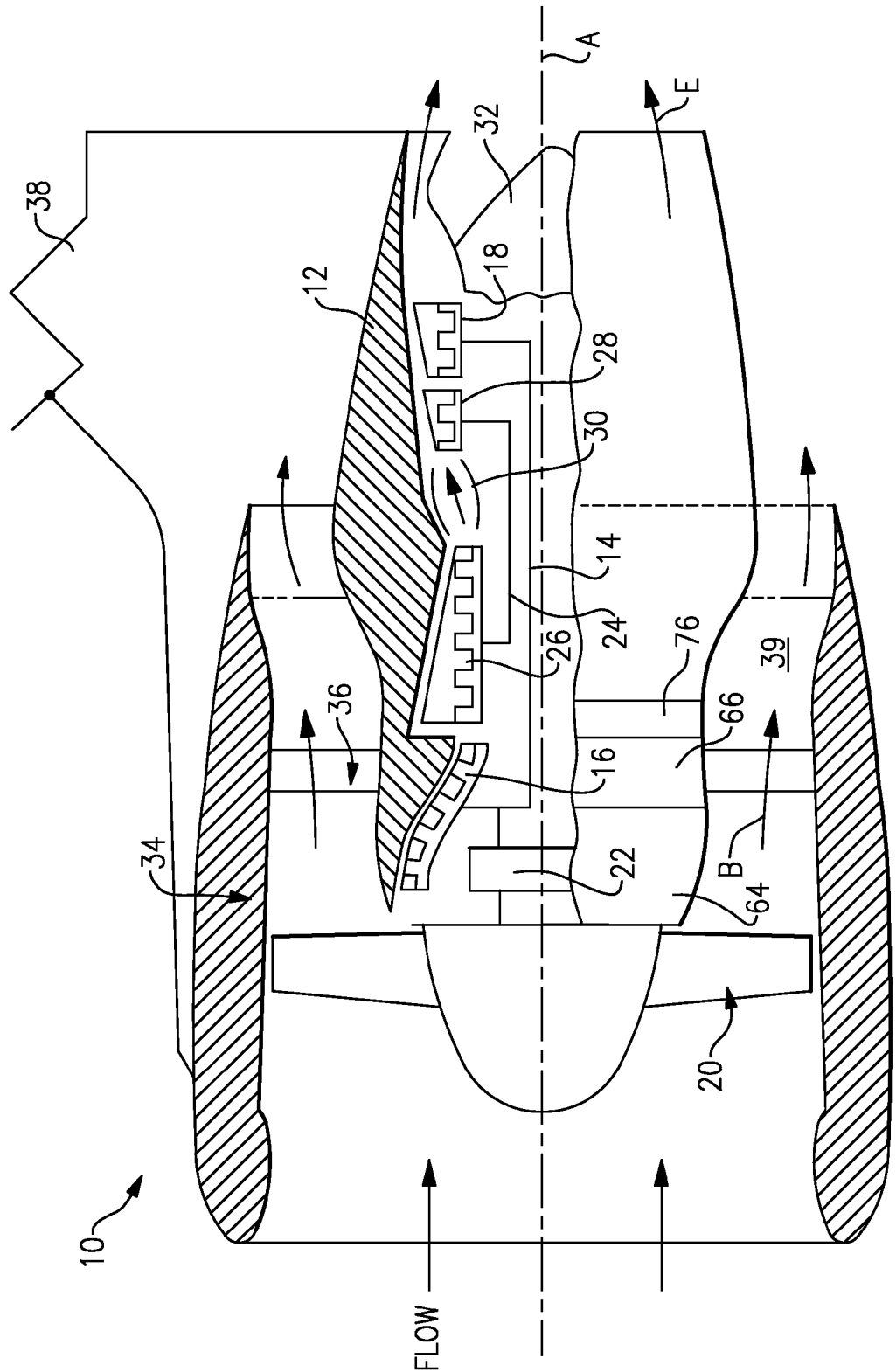
FIG. 1 illustrates a highly schematic cross-sectional view of a gas turbine engine with a geared architecture.

A turbofan engine 10 with a geared architecture is shown in FIG. 1. A pylon 38 secures the engine 10 to an aircraft. The engine 10 includes a core nacelle 12 that surrounds a low spool 14 and high spool 24 rotatable about an axis A. The low spool 14 supports a low pressure compressor 16 and low pressure turbine 18. In the example, the low spool 14 drives a fan 20 through a gearbox or gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the example shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicyclic gear train, for example, a star gear train, providing a gear reduction ratio of greater than 2.2:1. It should be understood, however, that the above parameters are only exemplary of a contemplated turbofan engine with a geared architecture. That is, the invention is applicable to other engines including direct drive turbofans.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle 12 and a tail cone 32.

Figure 2:
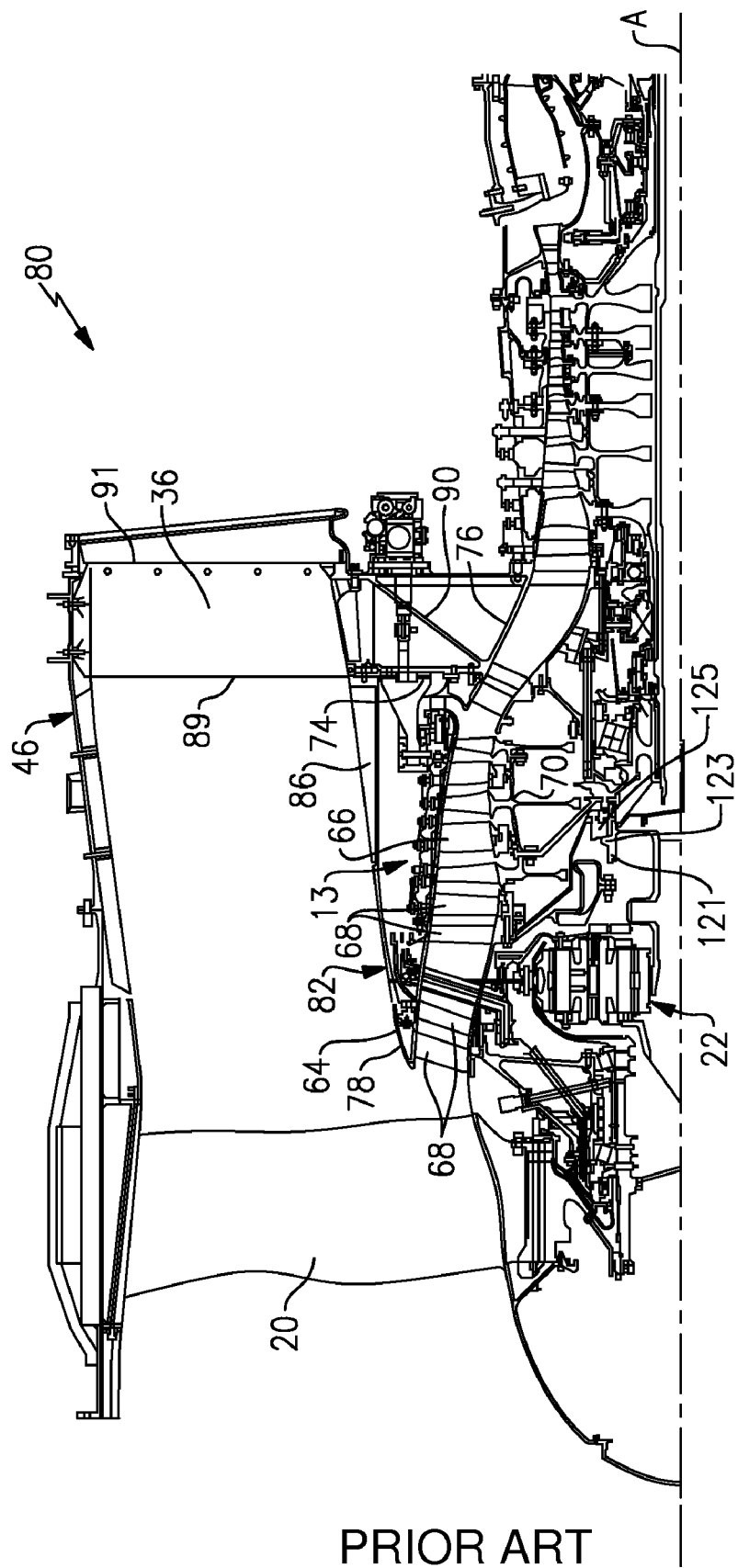
FIG. 2 illustrates a cross-sectional view of a case mounting and gearbox arrangement relative to the core housing.

Referring to FIG. 2, a core 13 is arranged within the core nacelle 12 and is supported within the fan nacelle 34 by structure 36, such as flow exit guide vanes, extending radially inwardly from a fan case 46. A generally annular bypass flow path 39 is arranged between the core and fan nacelles 12, 34. The examples illustrated in the Figures depict a high bypass flow arrangement in which approximately eighty percent of the airflow entering the fan nacelle 34 bypasses the core nacelle 12. The bypass flow B within the bypass flow path 39 exits the fan nacelle 34 through a fan nozzle exit area at the aft of the fan nacelle 34.

The core 13 generally includes at least an inlet case 64, a low pressure compressor case 66, and an intermediate case 76. The inlet case 64 guides airflow from the fan 20 to the low pressure compressor case 66. As shown in FIG. 2, the low pressure compressor case 66 in an example gas turbine engine 80 supports a plurality of compressor stator vanes 68. A rotor 70 rotates about the axis A, and, with the compressor stator vanes 68, help compress air moving through the low pressure compressor case 66.

The guide vanes 36 are axially aligned with the intermediate case 76 in one example. The guide vanes 36 secure the intermediate case 76 to the fan case 46. The guide vanes 36 each include at least a rearward attachment 74 and a forward attachment 78, which are arranged on a forward side 89 of the guide vanes 36. The rearward attachment 74 connects to the intermediate case 76 while the forward attachment 78 connects to the inlet case 64. An aft attachment 90 extends from an aft side 91 of the guide vanes 36 and intersects with the rearward attachment 74 at the front of the intermediate case 76. The lower pressure compressor case 66 is supported through the intermediate case 76 and the inlet case 64 in the arrangement shown in FIG. 2.

In one type of example gas turbine engine configuration shown in FIG. 2, a rear bearing compartment seal assembly for the gearbox 22 includes a seal plate 123 and a carbon seal 125. Removing the gearbox 22 as a module is not possible since the carbon seal 125 cannot move axially past the seal plate 123, which is affixed to the low pressure compressor rotor 121 and is not removed. As a result, the components of the gearbox 22 must be disassembled in order to remove it from the engine 80.

Figure 3:
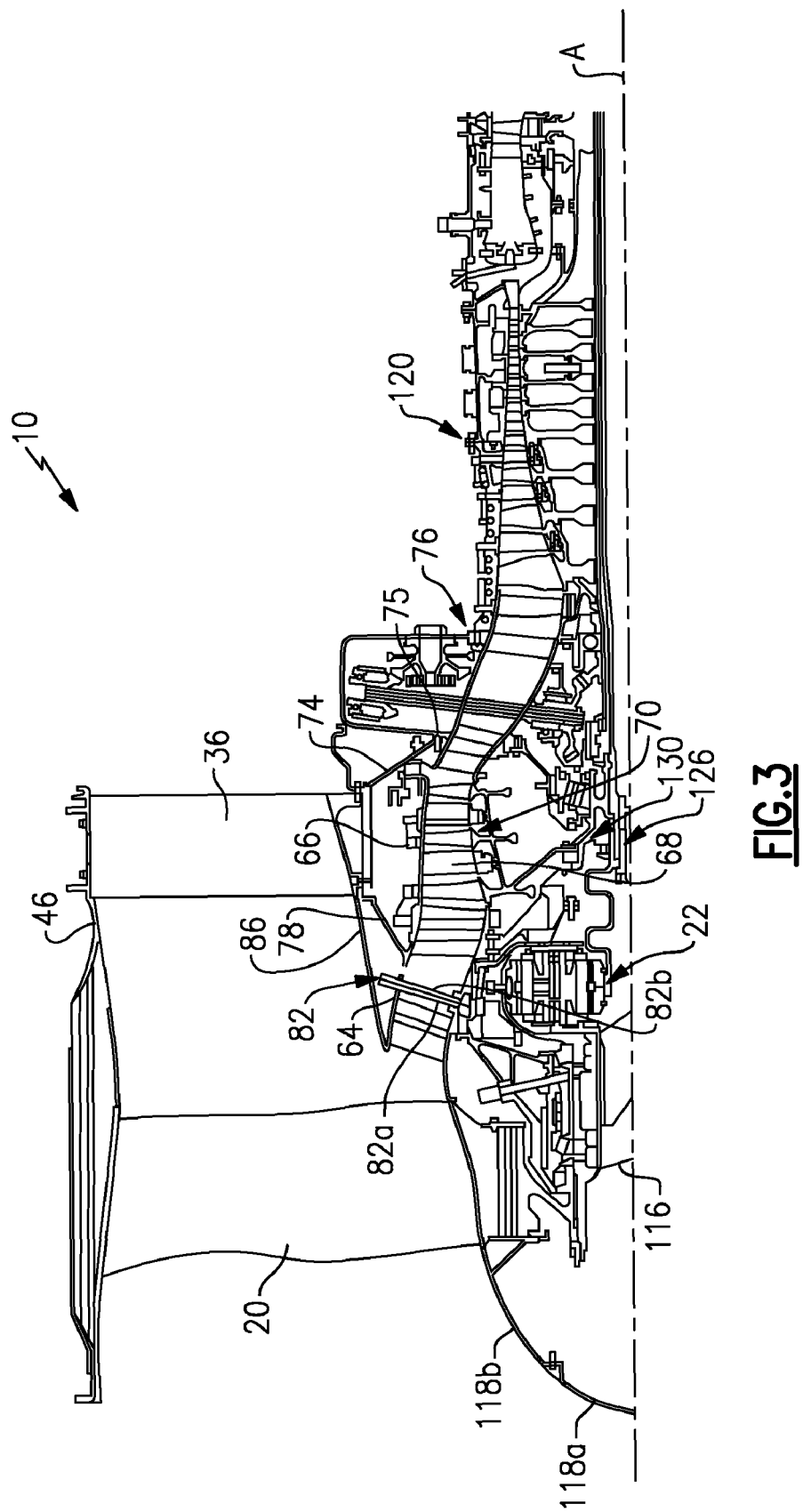
FIG. 3 illustrates a cross-sectional view of an example case mounting arrangement according to the disclosure.

Returning now to an example of the disclosed arrangement shown in FIG. 3, the forward attachment 78 attaches to a front portion of the low pressure compressor case 66. In this example, the forward attachment 78 extends from the guide vanes 36 to support the low pressure compressor case 66. Together, the forward attachment 78 and guide vanes 36 act as a support member for the low pressure compressor case 66. A plumbing connection area 82 is positioned upstream of the forward attachment 78 facilitating access to the plumbing connection area 82. In this example, an operator may directly access the plumbing connection area 82 after removing the fan stream splitter 86. The plumbing connection area 82 typically provides access to a lubrication system 82a, a compressed air system 82b, or both. The lubrication system 82a and compressed air system 82b are typically in fluid communication with the gear train 22.

Maintenance and repair of the gear train 22 may require removing the gear train 22 from the engine 10. Positioning the plumbing connection area 82 ahead of the forward attachment 78 simplifies maintenance and removal of the gear train 22 from other portions of the engine 10. Draining oil from the gear train 22 prior to removal may take place through the plumbing connection area 82 for example. The plumbing connection area 82 is typically removed with the gear train 22. Thus, the arrangement may permit removing the gear train 22 on wing or removing the inlet case 64 from the gas turbine engine 10 separately from the low pressure compressor case 66. This reduces the amount of time needed to prepare an engine for continued revenue service, saving an operator both time and money.

Connecting the forward attachment 78 to the low pressure compressor case 66 helps maintain the position of the rotor 70 relative to the interior of the low pressure compressor case 66 during fan rotation. In this example, the intermediate case 76 supports a rear portion of the low pressure compressor case 66 near a compressed air bleed valve 75.

Figure 5:
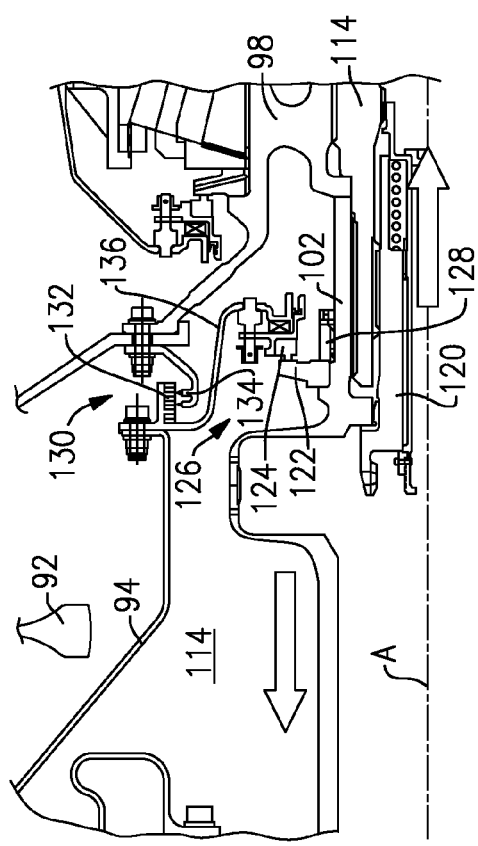
FIG. 5 illustrates an enlarged view of a portion of the module shown in FIGS. 3 and 4 depicting seal assemblies.
Figure 4:
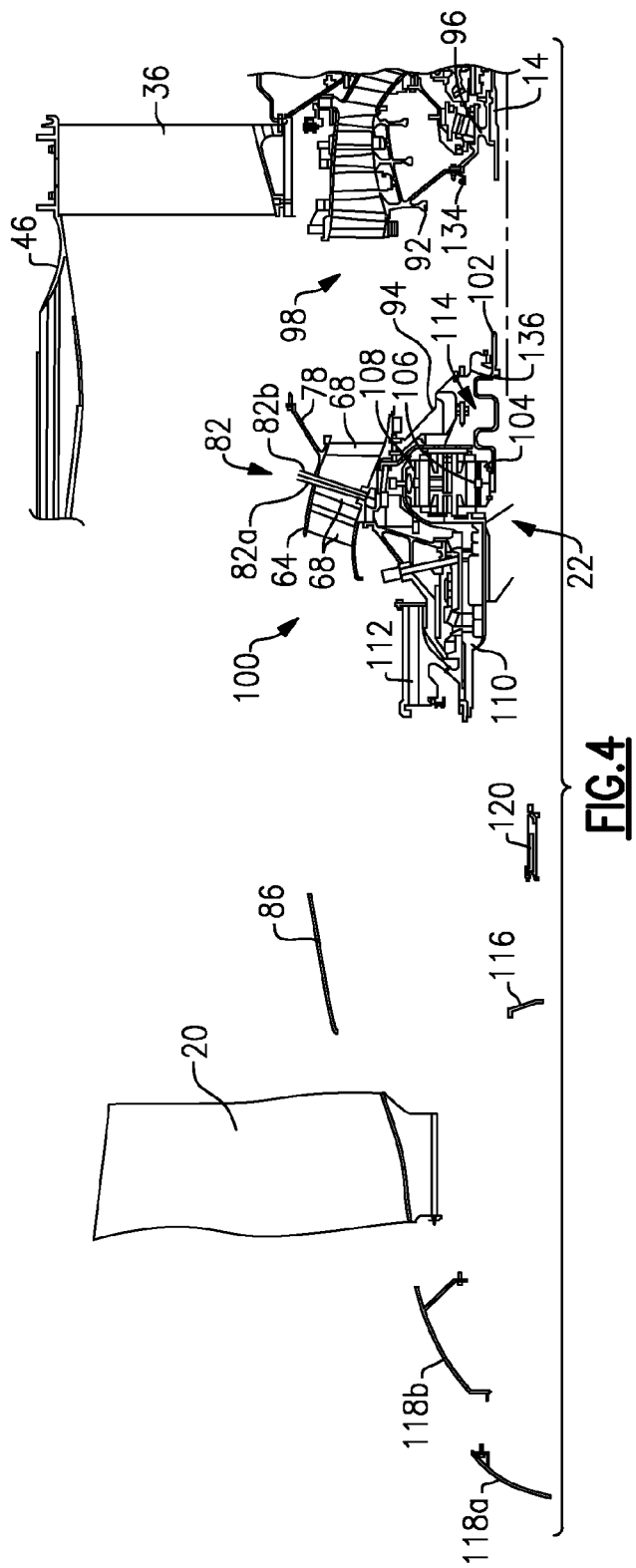
FIG. 4 illustrates an exploded view an engine front architecture, shown in FIG. 3, including an inlet case and gearbox module.

Referring to FIGS. 4 and 5, enlarged views are depicted of the example gas turbine configuration shown in FIG. 3, which permits removal of the gearbox 22 and inlet case 64 as a single unit. This enables replacement of the entire gearbox 22 on-wing or easy access to the compressor section. Stator vanes 68 extend radially between outer and inner walls of the inlet housing 64. A housing portion 94 extends from the inner wall of the inlet housing 64 toward an input shaft 102 of the gearbox 22.

The gearbox 22 includes the input shaft 102, which is connected to a central input gear 104. Intermediate gears 106 are arranged about and mesh with the input gear 104 and a ring gear 108. In the example shown, the ring gear 108 is coupled to an output shaft 110, which drives the fan 20. Blades of the fan 20 are mounted to a fan support 112 provided on the output shaft 110. A seal housing 136 provides a first seal assembly 126 that seals the bearing compartment 114. The seal housing 136 also carries a portion (honeycomb seal 132) of a second seal assembly 130 that provides a seal between the gearbox and inlet case module 100 relative to a low pressure compressor module 98.

To remove the gearbox and inlet case module 100, spinner portions 118a, 118b are removed from the fan support 112. The individual fan blades are disconnected from the fan support 112. The fan stream splitter 86 is removed from the inlet case 64, if desired. A shaft cover 116 is detached from the gearbox 22 to expose a low shaft nut 120. The low shaft nut 120 is removed to decouple the input shaft 102 from the low spool 14. The forward attachment 78 is disconnected from the flow exit guide vanes 36. The gearbox and inlet case module 100 can then be removed axially as a unit.

As can be appreciated from FIG. 5, the second seal assembly 130 is arranged radially inboard from the low pressure compressor rotor 92, which is mounted on hub 96, such that the gearbox and inlet case module 100 can be axially removed. The second seal assembly 130 includes a honeycomb seal 132 and knife edges 134 that permit axial movement of the gearbox and inlet case module 100. In the example shown, the first seal assembly 126 is removed with the module 100, which enables the bearing compartment 114 to remain intact preventing contamination. Only the shaft cover 116 is detached for removal of the gearbox and inlet case module 100 as a unit. The first seal assembly 126 includes a seal plate 122 that is supported by the input shaft 102 and a carbon seal 124 that is carried by the seal housing 136. The seal plate 122 can be serviced by removing the seal housing 136 from the housing portion 94, and removing a retainer 128 from the input shaft 102.

As can be appreciated by the example embodiment, the gearbox 22 does not need to be disassembled to gain access to the front of the core, for example, to the low pressure compressor rotor 92. Moreover, the bearing compartment 114 does not need to be compromised during removal of the module 100.

Although an example embodiment has been disclosed, a worker of ordinary skill in this art would recognize that certain modifications would come within the scope of the claims. For that reason, the following claims should be studied to determine their true scope and content.

What is claimed is:

1. A method of servicing a gas turbine engine comprising the steps of:
   providing a fastening element that secures a gearbox to an engine core, wherein the gearbox includes an input gear, intermediate gears surrounding and meshing with the input gear and a ring gear, the gears remaining in engagement with one another during the removing step, the gearbox includes a bearing compartment sealing the gearbox, the bearing compartment includes a first seal assembly arranged radially inwardly of a low pressure compressor rotor;
   disconnecting the fastening element from the engine core; and
   removing the gearbox as a module from engine core, the bearing compartment remaining assembled during the removing step, and the first seal assembly axially clearing the low pressure compressor rotor during the removing step.

2. The method according to claim 1, comprising a second seal assembly arranged between the low pressure compressor rotor and the module, the second seal assembly including first and second seal portions separating during the removing step.

3. The method according to claim 2, wherein the second seal assembly is arranged radially inward of the low pressure compressor rotor.

4. The method according to claim 1, wherein the disconnecting step includes decoupling an input shaft of the gearbox from a low pressure spool.

5. A method of servicing a gas turbine engine comprising the steps of:
providing a fastening element that secures a gearbox to an engine core;
disconnecting the fastening element from the engine core; and
removing the gearbox as a module from engine core, wherein the module of the removing step includes an inlet case connected to the gearbox and comprised in the module.

6. The method according to claim 5, wherein the removing step includes detaching the inlet case from flow exit guide vanes.

7. The method according to claim 5, wherein the module of the removing step includes an input shaft supporting a bearing compartment seal.

8. A gas turbine engine comprising:
a spool, wherein the spool includes a compressor section;
an inlet case arranged axially upstream from a compressor section;
a gearbox secured to the inlet case and including a bearing compartment having a seal assembly sealing the gearbox, wherein the gearbox and seal assembly provide a module; and
a fastening element removably securing the module relative to the spool, the module including the inlet case.

9. The gas turbine engine according to claim 8, wherein the seal assembly comprises a first seal assembly arranged between an input shaft of the gearbox and a housing portion extending from the inlet case toward the input shaft.

10. The gas turbine engine according to claim 9, wherein the first seal assembly is arranged radially inboard of a low pressure compressor rotor.

11. The gas turbine engine according to claim 9, comprising a second seal assembly arranged between a low pressure compressor module and the module.

12. The gas turbine engine according to claim 8, wherein the inlet case includes stator vanes extending between inner and outer inlet case walls.

13. The gas turbine engine according to claim 11, wherein a seal housing is interconnected between the housing portion and the input shaft, the first and second seal assemblies supported by the seal housing.

14. The gas turbine engine according to claim 8, wherein the inlet case includes a forward attachment extending radially outwardly and connected to flow exit guide vanes to support the inlet case relative thereto.

* * * * *